United States Patent [19]

Dohmeier

[11] Patent Number: 4,987,993

[45] Date of Patent: Jan. 29, 1991

[54] CONVEYOR BELT SCRAPER

[75] Inventor: Hans-Otto Dohmeier, Johannesburg, South Africa

[73] Assignee: Karl-Heniz Erdmann, Bedfordview, South Africa; a part interest

[21] Appl. No.: 475,018

[22] Filed: Feb. 5, 1990

[30] Foreign Application Priority Data

Feb. 8, 1989 [ZA] South Africa .................. 89/0966

[51] Int. Cl.$^5$ ............................................. B65G 45/00
[52] U.S. Cl. ................................... 198/499; 15/256.5
[58] Field of Search ............... 198/499, 497; 15/256.5, 15/256.51

[56] References Cited

U.S. PATENT DOCUMENTS

| | | | |
|---|---|---|---|
| 2,545,883 | 3/1951 | Hall | 198/499 |
| 4,105,109 | 8/1978 | Schultz | 198/499 |
| 4,290,520 | 9/1981 | Rhodes | 198/499 |
| 4,915,211 | 8/1990 | Dohmeier | 198/499 |

FOREIGN PATENT DOCUMENTS

81/7242 10/1981 South Africa .

Primary Examiner—H. Grant Skaggs
Assistant Examiner—Cheryl L. Gastineau
Attorney, Agent, or Firm—Ladas & Parry

[57] ABSTRACT

A conveyor belt scraper comprising an elongate frame defining an elongate aperture; at least one elongate scraper blade member guided for movement within and transversely to the aperture so that it can move towards and away from a belt to be cleaned; mounting structure provided towards each end of the frame for mounting the frame with respect to a belt to be cleaned; a spring support pivotally connected to the frame; and a leaf spring supported on the spring support, the spring support and the spring being arranged such that the spring engages the scraper blade member and biases it, in use, outwardly of the aperture and towards a belt being cleaned. The belt scraper is open to facilitate cleaning and minimize the collection of undesirable fluids and dirt which can cause corrosion and interfere with the smooth functioning of the blade biassing components.

18 Claims, 1 Drawing Sheet

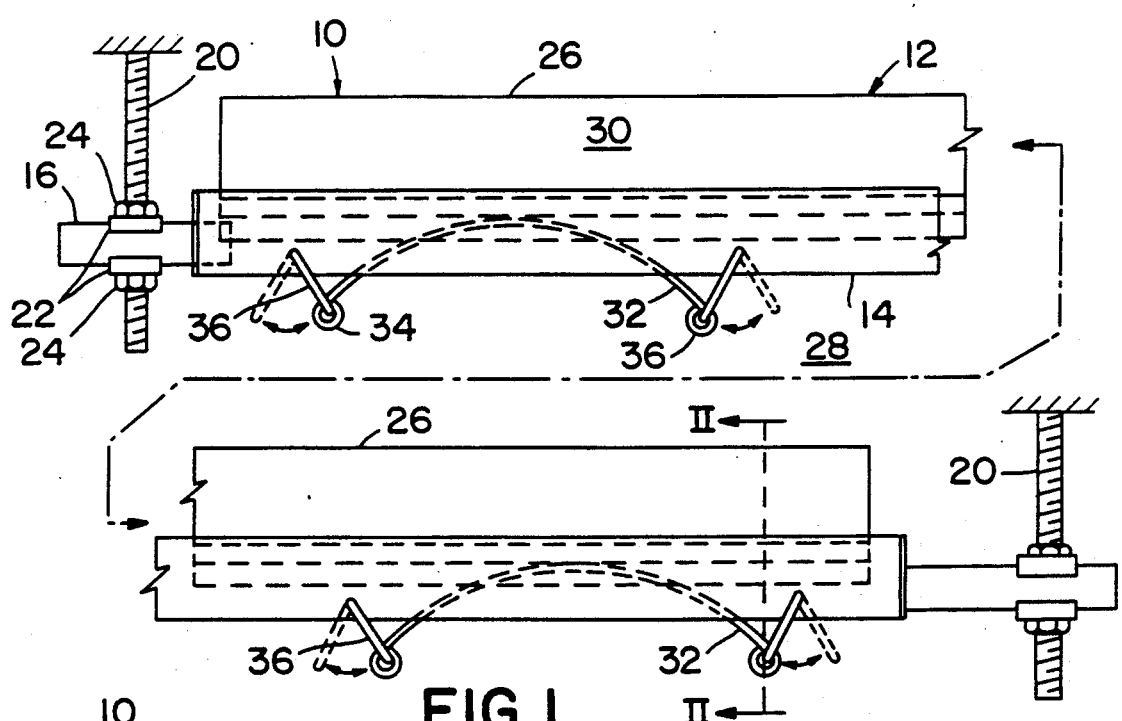
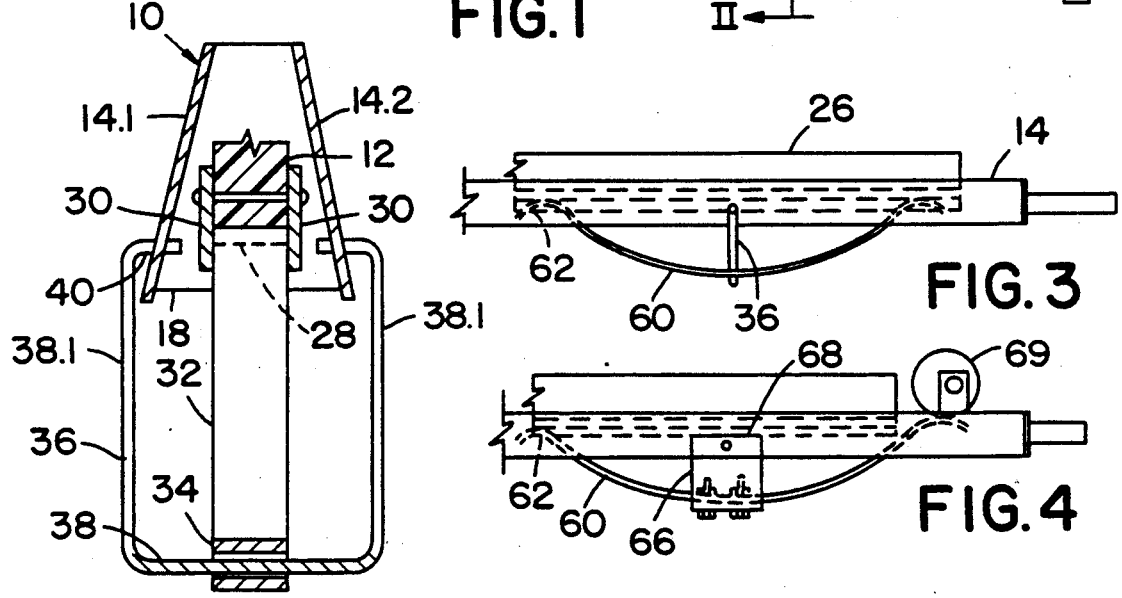
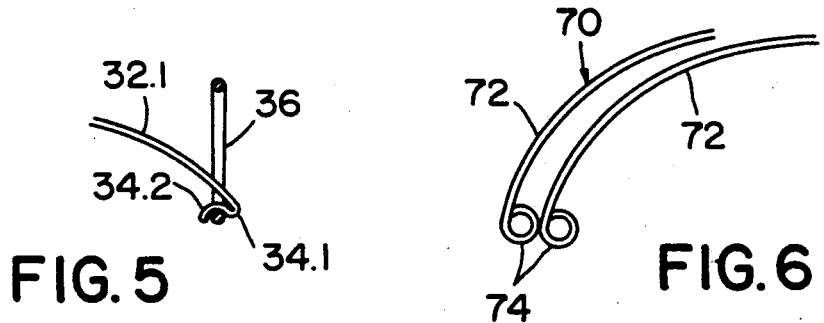

CONVEYOR BELT SCRAPER

FIELD OF THE INVENTION

This invention relates to a belt scraper. More particularly, though not necessarily exclusively, the invention is concerned with an apparatus for supporting and biasing an elongate scraper blade member, that may be unitary or in elongate segments, to clean a conveyor belt that is supported on rollers mounted on a conveyor belt frame apparatus.

BACKGROUND OF THE INVENTION

There are many types of conveyor belt scraper wherein one or several scraper blades are supported by a scraper apparatus to be urged against a belt to be scraped. Known apparatus may be broadly categorized as being of the counterbalance type, rotating spring type, and linear biassing type. The different types have relative advantages and disadvantages depending on environment in which they are to be used, material to be scraped, type of blade, width of belt, ease of maintenance and so on. This invention is concerned with apparatus of the last mentioned type.

Britz South African Pat. No. 81/7242 teaches a belt scraper including a housing with an elongate opening, an elongate scraper blade partly within the housing, and spring means in the housing acting on the blade to urge it outwardly from the housing against the belt to be scraped. The spring means comprises a plurality of coil springs, each of which is supported on an adjusting bolt that can be screwed into the housing in a direction parallel to the plane of the blade. The housing is formed in two separable parts to allow access to the interior of the housing for replacing the blade and cleaning purposes. In practice, this works satisfactorily, but has certain defects. For instance, adjusting the force which the coil springs urge the blade against the belt is cumbersome as each of the spring adjusting bolts has to be adjusted separately and may be dangerous if workmen have to work underneath the belt, especially when the belt is in use. The housing has to be separated to remove and replace a blade by loosening connecting bolts; this is time consuming. Also, dirt and water enter the housing which ultimately interferes with the free movement of the blade and causes rusting; this ingress of undesirable matter occurs even with the tolerances between the housing and blade being as small as possible within practical limits.

To overcome these defects the applicant proposed the invention disclosed in U.S. Ser. No. 157,732 filed Feb. 18, 1988 and now allowed, which teaches a scraper blade in a housing that is open in a direction away from a belt being cleaned, with the blade being biased by an elongate resilient strip passing along the length of the edge of the blade remote from its working edge. Means for tensioning and locking both ends of the tensioning strip is provided at each end of the belt scraper. This scraper satisfactorily overcomes the jamming, cleaning, replacement, retensioning, uniform tensioning and rusting problems and maintains tension over long periods and as the blade wears. However, while suitable for short blades, such as up to 1 or 1.5 meters, it has been found that it is difficult to obtain the required tension for longer blades.

This invention seeks to improve on the invention disclosed in the aforementioned U.S. application by providing a conveyor belt scraper that retains the benefits of the previous invention while being suitable for a full range of widths of conveyor belts and be capable of urging the blade against the belt with greater pressures when required.

SUMMARY OF THE INVENTION

One aspect of the invention provides a belt scraper comprising an elongate frame defining an elongate opening; at least one scraper blade member guided for movement within and transversely to the aperture so that it can move towards and away from a belt to be cleaned; mounting means provided towards each end of the frame for mounting the frame with respect to a belt to be cleaned; spring support means connected to the frame; and spring means supported on the spring support means, the spring means being an elongate, arcuate leaf spring and the spring means and spring support means being arranged, in use, to bias the scraper blade outwardly of the aperture and towards a belt being cleaned.

Preferably the spring support means is pivotally connected to the frame, and preferably the spring means is pivotally connected to the spring support means. Both of these features are intended to allow full movement of the leaf spring as the blade wears or the belt is loaded to different extents so that maximum effectiveness is obtained from the resilience of the leaf springs. Also the pivoted leaf spring construction ensures the spring support means and spring means can adjust automatically to apply a substantially uniform biasing force to the scraper blade, at least in certain embodiments.

Preferably the spring support means is in the form of a hanger of substantially U-shape having a web and flanking leg portions and pin formation extending substantially from the free ends of the leg portions in a direction generally towards each other. In one form the hanger is formed of resilient metal rod with the pin formations being formed by bending end regions of the leg portions. In another form separate pin formations are connected to the leg portions to project towards each other. In each event the pin formations engage in substantially opposed openings in the elongate frame, so that the hanger can pivot with respect to the frame.

The spring support means is preferably removably connected to the frame. To this end the support means is preferably resilient so that it can be resiliently deformed for disengaging it from and attaching it to the frame. Thus the spring support means, the spring means and the scraper blade can easily be removed from the frame in a direction away from a belt being cleaned for replacing the scraper blade. This construction is suited to all forms of scraper blade member and particularly to a unitary elongate scraper blade member, especially where there is a plurality of support means at intervals along the frame, or when the spring means is, for practical purposes, connected to the support means.

Additionally or alternately the spring means may be removably connected to the support means. With this arrangement the spring means can be removed to allow the scraper blade member to be removed. This arrangement caters for a scraper blade member that is in sections or otherwise and that can be tilted or moved past the support members for removal and replacement. The support means supports the blade directly when the spring means is removed.

Each end of the leaf spring may be pivotally connected to the frame by the support means and arranged such that a central region of the leaf spring bears against the scraper blade in use. In this form there are preferably at least two spaced leaf springs to ensure the scraper blade is stably supported.

Alternatively, the centre of the leaf spring may be connected to the support means which is pivotally connected to the frame, the leaf spring being arranged such that at least one of its ends bears against the scraper blade in use. In this form, mainly but not exclusively for relatively short scraper blades, each end of the leaf spring may bear against the scraper blade. Alternatively, only one end of the leaf spring may bear against the scraper blade, with the other end engaging an adjusting member for adjusting the force which the leaf spring applies against the blade.

Preferably the scraper blade member has channel forming means forming a channel section along its edge remote from its working edge. The channel section is dimensioned to receive a portion of the spring means for stabilising and ensuring constant engagement of the spring means and scraper blade member in use.

Further features, variants, advantages, and/or benefits of the invention will become apparent from the following description made with reference to the accompanying schematic drawings of non-limiting preferred embodiments of belt scraper of the invention.

BRIEF DESCRIPTION OF THE DRAWINGS

FIG. 1 shows a side view of an embodiment of belt scraper of the invention;

FIG. 2 shows, on an enlarged scale, a section along II—II of FIG. 1;

FIG. 3 shows a side view of a portion of a variant of the invention;

FIG. 4 shows a side view of a portion of another variant of the invention; and

FIG. 5 shows, in side view, a portion of a variation of spring means for the embodiment of FIG. 1.

FIG. 6 shows, in perspective view a portion of a variant of construction of leaf spring for the invention.

DESCRIPTION OF PREFERRED EMBODIMENTS

In the drawings the same or similar parts are indicated by the same reference numerals.

FIGS. 1 and 2 show a belt scraper 10 including an elongate scraper blade 12 supported in a frame 14 and resiliently biased outwardly of the frame for cleaning a conveyor belt, not shown.

The frame 14 is elongate and is composed of two inclined metal strips 14.1 and 14.2 forming a substantially A-frame construction. Mountings 16 are secured to each end of the strips 14, each mounting being a flat metal strip bent into an elongate U-shape and welded to the strips 14. Reinforcing fillet pieces 18 are welded at each end of the strips 14.

Each end of the frame 14 is adjustably supported on a conveyor belt frame, not shown, by a threaded bar 20 secured to the conveyor belt frame, a pair of rectangular washers 22 that have lips which overlap and engage opposed sides of the mounting 16, and a pair of nuts 24 on the bar 20 and straddling the washers 22. Moving the nuts 24 along the bars 20 adjusts the spacing of the frame 14 relative to a conveyor belt frame and hence belt to be cleaned. The nuts are tightened to lock the frame in a desired position.

The blade 12 has a working edge 26 with a channel section 28 formed by opposed metal side plates 30 secured to the edge of the blade remote from the working edge 26.

The blade 12 is resiliently supported with respect to the frame by leaf springs 32 that each have a medial region seated within the channel section 28 and in contact with the edge of the blade remote from the working edge 26.

Each end of the leaf spring 32 is turned over to form a loop 34 which receives a U-shaped hanger 36 formed of 6 mm diameter spring steel wire rod and having a web 38 and leg portions 38.1. Free end regions of the leg portions 38.1 are bent inwardly to face each other and form connecting pin formation 40 that are received in holes in the side plates 14.

In practice, the belt scraper is installed and used as follows.

First the frame 14 is connected to a conveyor belt frame by securing the threaded bars to suitable mountings on the frame or by welding the bars to the conveyor belt frame. The nuts 24 are slackened off, i.e. the upper nut is moved upwardly while the lower nut is moved downwardly towards the end of the bar 20. A scraper blade 26 is inserted into the frame in a direction towards the belt to be cleaned. The springs 32 are then positioned in the frame and connected to the frame by engaging the inturned ends 40 of the hangers 36 with the side plates 14 while ensuring each leaf spring seats in the channel section 30 of the scraper blade. The blade is then tensioned against the belt to be cleaned by rotating the lower nut 24 to move the frame towards the belt until a desired degree of belt deflection is obtained. During this operation the leaf springs deform resiliently to a flatter shape in side view, with the pairs of hangers supporting each spring rotating away from each other. Finally the upper lock nut 24 is tightened to lock the frame with respect to the conveyor belt frame.

The resilience of the springs 32 combined with the pivoting action of the hangers 36 allows the springs 32 to move freely to ensure the blade remains in satisfactory contact with the belt as the blade wears in use. If needed, the springs can be retensioned by adjusting the position of the frame on the threaded bars 20. As will be appreciated all adjustments for retensioning are done from the sides of the belt scraper so that the belt need not be stopped when retensioning is required and operators at all times work safely at the sides of the conveyor belt.

When a blade is to be replaced, then the frame is moved away from the belt by adjusting the nuts 24 to release tension on the springs so that they can be removed by disconnecting the hangers from the side plates. After the hangers have been removed the blade is removed from the frame. The new blade is then installed in the reverse order and tensioned in the same was as described above.

FIG. 3 shows a variant including a leaf spring 60 centrally supported on a hanger 36 of the type described above. In this event the leaf spring is "upside down" with the free ends 62 of the spring being curved and in contact with the scraper blade 26. The hanger 36 is connected to the centre of the leaf spring 60 by a shackle 64. This arrangement may be used for small scrapers where a single leaf spring can provide sufficient support for effective functioning of the scraper blade 26. The pivoting arrangement of the leaf spring ensures both ends of the scraper blade are substantially equally biased by the leaf spring in use. The blade and springs are installed and replaced in the same manner as that described for the FIG. 1 embodiment above. However, if there is sufficient free space at the ends of the blade, then it may be possible to remove the blade by loosening the frame mounting 16 sufficiently to allow the blade to be tilted and moved into and out of its operating position in the frame 14. In use, as the blade wears, the ends 62 of the leaf spring can slide along the blade while being retained within the channel 30.

FIG. 4 shows a variant similar to that shown in FIG. 3 except that the centre of the leaf spring 60 is securely clamped to a U-shaped metal strip 66 which is pivotally supported on the side plates 14 by pins 68 that are connected to the metal strip 66 and seat pivotally in opposed holes in the frame members 14. One end of the leaf spring bears against the underside of the blade 26 while the other bears against a cam 69 that is rotatably supported on the mounting 16. The cam can be rotated to adjust the bias or force applied by the spring 60 against the blade 26. Means, such as a pawl and ratchet mechanism—not shown, is provided for moving the cam and for locking it in a desired position.

FIG. 5 shows a portion of a variant of leaf spring 32.1 having an end region 34.1 that is and bent into a small arc 34.2 that curves in the same direction as the body of the spring. The arc 34.2 is shaped to receive the web 38 of the hanger 36. This allows the hanger and spring to be disengaged by levering the spring away from the web of the hanger to remove the spring 32.1 independently of the hangers. The frame can first be moved away from the belt being cleaned to relax the pressure between the leaf spring and the hangers. The hangers are used for holding the blade 26 when the springs have been removed, so that the scraper blade can be moved out of the frame and away from the belt by sliding it along the hangers; for this purpose the leg portions of the hangers can be made sufficiently long and the leaf springs sufficiently curved for the scraper blade member to be clear of the frame when the tension on the springs is relaxes. This arrangement also facilitates assembly of the belt scraper as the springs 32.1 and hangers 36 can be heat treated separately. Also the springs and hangers can be replaced independently of each other should this be required.

FIG. 6 shows a portion of a variant of leaf spring 70 constructed from a pair of round spring steel rods 72 bent into an arcuate shape, only a portion of which is illustrated, with each rod having a loop formation 74 at each end. This is clearly equivalent to a conventional leaf spring made from flat steel strip. This variant is intended to facilitate the manufacture of leaf springs as for some manufacturers it is easier to bend several round rods of relatively thin diameter, say 2 to 6 mm, than a flat strip of equivalent thickness. This construction also facilitates threading of a plurality of preformed leaf spring elements on to a hanger 36 of the type shown in FIG. 2. A further benefit is that the force applied by the leaf spring can be adjusted, i.e. increased or decreased, by correspondingly increasing the number of rods 72 which are used.

The flexibility of the leaf spring together with the pivotal mounting of the hangers ensures a satisfactory bias will be applied to the blade for an extensive period as the blade wears in use. Also the bias will be applied substantially evenly across the width of the belt. The belt scraper is open to facilitate cleaning and minimise the collection of undesirable fluids and dirt which can cause corrosion and interfere with the smooth functioning of the blade biassing components. Moreover, if the blade is formed as a plurality of elongate sections, then it is possible to remove worn sections independently of other still usable sections.

The invention is not limited to the precise constructional details shown in the drawings and described above and modifications may be made thereto, other embodiments will become apparent from the described embodiments and suitable combinations of features of the embodiments can be made without departing from the spirit of the invention or the scope of the claims.

I claim:

1. A belt scraper comprising an elongate frame defining an elongate aperture; at least one scraper blade member guided for movement within and transversely to the aperture so that it can move towards and away from a belt to be cleaned; mounting means provided towards each end of the frame for mounting the frame with respect to a belt to be cleaned; spring support means connected to the frame; at least one elongate, accurate leaf spring supported on the spring support means, and the leaf spring and spring support means being arranged, in use, to bear against an edge of the scraper blade member to bias the scraper blade member outwardly of the aperture and towards the belt being cleaned.

2. The belt scraper of claim 1, wherein the spring support means is pivotally connected to the frame.

3. The belt scraper of claim 1, wherein the leaf spring is pivotally connected to the spring support means.

4. The belt scraper of claim 1, wherein the spring support means is in the form of a hanger of substantially U-shape having a web and flanking leg portions and pin formations extending substantially from the free ends of the leg portions in a direction generally towards each other.

5. The belt scraper of claim 4, wherein the hanger is formed of resilient metal rod with the pin formations being formed as bent end regions of the leg portions.

6. The belt scraper of claim 4, wherein separate pin formations are connected to the leg portions of the hanger to project towards each other.

7. The belt scraper of claim 4, wherein the pin formations engage in substantially opposed openings in the elongate frame.

8. The belt scraper of claim 1, wherein the spring support means is removably connected to the frame.

9. The belt scraper of claim 1, wherein the leaf spring is removably connected to the spring support means.

10. The belt scraper of claim 1, wherein each end of the leaf spring is pivotally connected to the frame by a spring support means and arranged such that a central region of the leaf spring bears against the scraper blade member in use.

11. The belt scraper of claim 1, wherein the center of the leaf spring is connected to the spring support means which is pivotally connected to the frame, the leaf spring being arranged such that at least one of its ends bears against the scraper blade member in use.

12. The belt scraper of claim 11, wherein each end of the leaf spring bears against the scraper blade member.

13. The belt scraper of claim 11, wherein only one end of the leaf spring bears against the scraper blade member with the other end engaging an adjusting member for adjusting the force which the leaf spring applies against the scraper blade member.

14. The belt scraper of claim 1, wherein the scraper blade member has channel forming means forming a channel section along its edge remote from its working edge, the channel section being dimensioned to receive a portion of the leaf spring for stabilizing and ensuring constant engagement of the leaf spring and scraper blade member in use.

15. The belt scraper of claim 1, wherein the leaf spring comprises at least one rod bent into an appropriate arcuate shape.

16. The belt scraper of claim 14, wherein a plurality of bent rods are provided to form the leaf spring, the number of rods being selected according to the compressive force required for urging the scraper blade member against the belt to be cleaned in use.

17. The belt scraper of claim 1, wherein the leaf spring comprises a resilient flat strip formed into an appropriate accurate shape.

18. The belt scraper of claim 1, wherein a plurality of leaf springs are provided along the length of the scraper blade member.

* * * * *